United States Patent
Haugh

(10) Patent No.: US 7,308,562 B2
(45) Date of Patent: Dec. 11, 2007

(54) SYSTEM AND METHOD FOR IMPROVED BRANCH PERFORMANCE IN PIPELINED COMPUTER ARCHITECTURES

(75) Inventor: Julianne Frances Haugh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 10/443,673

(22) Filed: May 22, 2003

(65) Prior Publication Data

US 2004/0236928 A1 Nov. 25, 2004

(51) Int. Cl.
- *G06F 9/30* (2006.01)
- *G06F 9/40* (2006.01)
- *G06F 15/00* (2006.01)
- *G06F 7/38* (2006.01)
- *G06F 9/00* (2006.01)
- *G06F 9/44* (2006.01)

(52) U.S. Cl. ........................ 712/214; 712/233
(58) Field of Classification Search ................ 712/214
See application file for complete search history.

(56) References Cited

U.S. PATENT DOCUMENTS

| | | | | |
|---|---|---|---|---|
| 5,485,629 A | * | 1/1996 | Dulong | 712/24 |
| 5,625,837 A | * | 4/1997 | Popescu et al. | 712/23 |
| 5,745,726 A | * | 4/1998 | Shebanow et al. | 712/216 |
| 6,487,715 B1 | * | 11/2002 | Chamdani et al. | 717/154 |

OTHER PUBLICATIONS

Structured Computer Organization by Andrew S. Tanenbaum.*

* cited by examiner

*Primary Examiner*—Eddie Chan
*Assistant Examiner*—Brian P Johnson
(74) *Attorney, Agent, or Firm*—VanLeeuwen & VanLeeuwen; Diana R. Gerhardt

(57) ABSTRACT

A system and method for improved branch performance in pipelined computer architectures is presented. Priority bits are set during code execution that corresponds to an upcoming branch instruction. A priority bit may be associated with a register, a resource, or a microsequencer. An instruction selector compares one or more priority bits with each of a plurality of instructions in order to identify particular instructions to execute that make registers and resources available for an upcoming branch instruction. The instruction selector then prioritizes the identified instructions and the pipeline executes in instructions in the prioritized order.

9 Claims, 7 Drawing Sheets

SYSTEM AND METHOD FOR IMPROVED BRANCH PERFORMANCE IN PIPELINED COMPUTER ARCHITECTURES

BACKGROUND OF THE INVENTION

1. Technical Field

The present invention relates in general to a system and method for improved branch performance in pipelined computer architectures. More particularly, the present invention relates to a system and method for instructing a pipeline as to which instruction to execute from a plurality of executable instructions.

2. Description of the Related Art

Code execution performance is an integral factor of a computer system. An increase in code execution performance increases the overall performance of a computer system. Pipelining is used in a computer system to improve code execution performance of a computer system. Pipelining is a technique whereby a microprocessor begins executing a second instruction before the microprocessor finishes a first instruction Several instructions are simultaneously in a pipeline, each at a different processing "stage".

A pipeline is divided into stages and each stage executes its operation concurrently with the other stages. For example, a pipeline may be divided into an instruction decode stage and an instruction execution stage. When a stage completes an operation, the stage passes its result to a following stage in the pipeline and fetches a subsequent operation from a preceding stage in the pipeline. The results of each instruction emerge at the end of a pipeline in rapid succession.

Pipelining does not decrease the time for individual instruction execution but rather it increases instruction throughput. The throughput of the instruction pipeline is determined by how often an instruction exits in the pipeline. A challenge found, however, is that a pipeline often encounters a "stall" which prevents the pipeline from executing a particular instruction during a designated clock cycle. For example, a stall occurs when an instruction cannot execute because the instruction uses a particular register's value whereby the register is currently in use by a previous instruction. A pipeline stall creates a situation at subsequent clock cycles whereby the pipeline is faced with a plurality of instructions to execute that require the same resources and the pipeline has to select one instruction to execute from the plurality of executable instructions. In this situation, the pipeline executes instructions in sequential order.

Branch instructions are used in code which branch to a particular code segment based upon the results of a condition, such as the value of a register. When a branch instruction encounters a stall while in a pipeline, the pipeline continues to load instructions subsequent to the branch instruction that may be cleared depending upon the result of the branch instruction. A challenge found is identifying an instruction from a plurality of executable instructions, which minimize branch instruction stall occurrences.

What is needed, therefore, is a system and method for identifying and executing an instruction from a plurality of executable instructions, which minimize branch instruction stall occurrences, thereby improving branch performance in a pipeline.

SUMMARY

It has been discovered that the aforementioned challenges are resolved by prioritizing an instruction prior to a branch instruction based upon the instruction's register usage and resource usage. An instruction selector compares one or more priority bits with each of a plurality of instructions in order to identify particular instructions to execute that make registers and resources available for an upcoming branch instruction.

Priority bits are set during code execution that inform the instruction selector as to which instructions, from a plurality of executable instructions, to prioritize. For example, if a branch instruction requires register three, a priority bit is set corresponding to register three. In this example, the priority bit informs the instruction selector to prioritize instructions that use register three.

A priority bit corresponds to a particular entity, such as a register, a resource, or a microsequencer. A register priority bit identifies a particular register location that a branch instruction uses whereby instructions that use the same register location are prioritized. A resource priority bit identifies a particular resource, such as an ADDER, that an instruction corresponding to a branch instruction uses whereby instructions using the same resource are prioritized. A microsequencer priority bit identifies particular circuitry, such as a high-speed bus, that an instruction corresponding to a branch instruction uses whereby instructions using the same circuitry are prioritized.

The instruction selector analyzes a plurality of executable instructions located in the pipeline and compares the executable instructions with priority bits in order to prioritize particular instructions located in the plurality of executable instructions. The instruction selector then prioritizes the executable instructions and the pipeline executes in instructions in the prioritized order.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
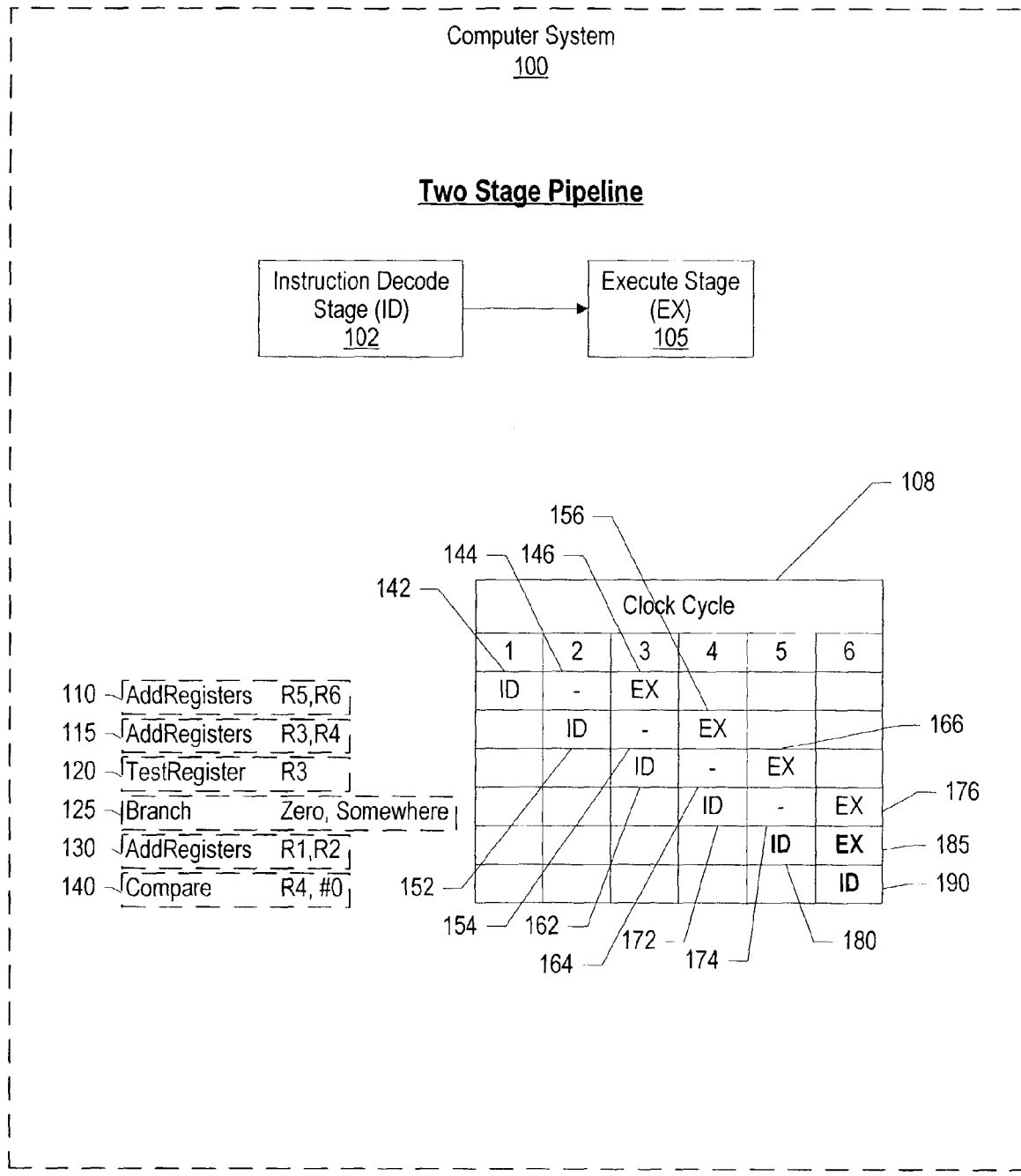
FIG. 1 is a diagram showing instruction execution in a pipeline without the present invention.

FIG. 1 is a diagram showing instruction execution in a pipeline without the present invention. FIG. 1 shows computer system 100 that includes a pipeline with two stages which are instruction decode stage 102 and execute stage 105. The two-stage pipeline receives an instruction, decodes the instruction, and executes the instruction. Table 108 shows six clock cycles and pipeline activities that are performed during each clock cycle. Instructions 110 through 140 are sequentially loaded into the two-stage pipeline, starting with instruction 110.

Instruction 110 is decoded during the first clock cycle (block 142). During the second clock cycle, the pipeline identifies that it is not able to execute instruction 110 because one of the registers that instruction 110 requires, such as R6, is still in use from a previous instruction. Therefore, the pipeline does not execute instruction 110 until the previous instruction is finished using the required register. For example, a previous instruction may be "registers AddRegisters R6, R8" and the previous instruction has not finished adding the contents of register eight with register six. Therefore, instruction 110 is "stalled" at the second clock cycle (block 144). The pipeline also decodes instruction 115 during the second clock cycle (block 152).

During the third clock cycle, instruction 110's required register is ready to use and the pipeline is able to execute either instruction 110 or instruction 115. Both instruction 110 and instruction 115 require an ADDER. However, the pipeline's device only has one ADDER which causes the pipeline to execute instructions in sequential order. Therefore, the pipeline executes instruction 110 during the third clock cycle (block 146). This decision results in a stall for instruction 115 (block 154). The pipeline also decodes instruction 120 (block 162) during the third clock cycle.

During the fourth clock cycle, the pipeline executes instruction 115 (block 156) which adds register three with register four and places the result in register three. Since register three is in use during the fourth clock cycle, instruction 120 is stalled because it requires register three (block 164). The pipeline also decodes instruction 125 during the fourth clock cycle (block 172).

During the fifth clock cycle, the pipeline executes instruction 120 which tests register three for a particular condition. Since register three is in use during the fifth clock cycle, the pipeline stalls instruction 125 which requires register three (block 174). This branch instruction stall is detrimental in pipeline performance because the pipeline continues to load instructions that may be cleared based upon the results of instruction 125. The pipeline also decodes instruction 130 during the fifth clock cycle (block 180) which, based upon the branch result, may be cleared.

During the sixth clock cycle, the pipeline executes instruction 125 (block 176) which informs processing to branch to a separate code section on the next clock cycle. Since instruction 130 uses a different resource than instruction 125, the pipeline also executes instruction 130 during the sixth clock cycle (block 185). The pipeline also decodes instruction 140 during the sixth clock cycle (block 190) which, based upon the branch result, is cleared on the next clock cycle.

On the seventh clock cycle, processing branches to a different part of the code due to the results of instruction 125, and the pipeline clears instructions 130 and 140 because they are not used.

By stalling the branch instruction (e.g. instruction 125) during the fifth clock cycle, the pipeline had to clear an instruction (e.g. instruction 140) that would not have been loaded if the branch instruction had executed during the fifth clock cycle. Instruction 125's stall is traced back to the pipeline deciding to execute instruction 110 rather than instruction 115 during the third clock cycle. As one skilled in the art can appreciate, as the number of stages increase in a pipeline, the number of instructions that are cleared in a pipeline from a branch command also increases.

Figure 2:
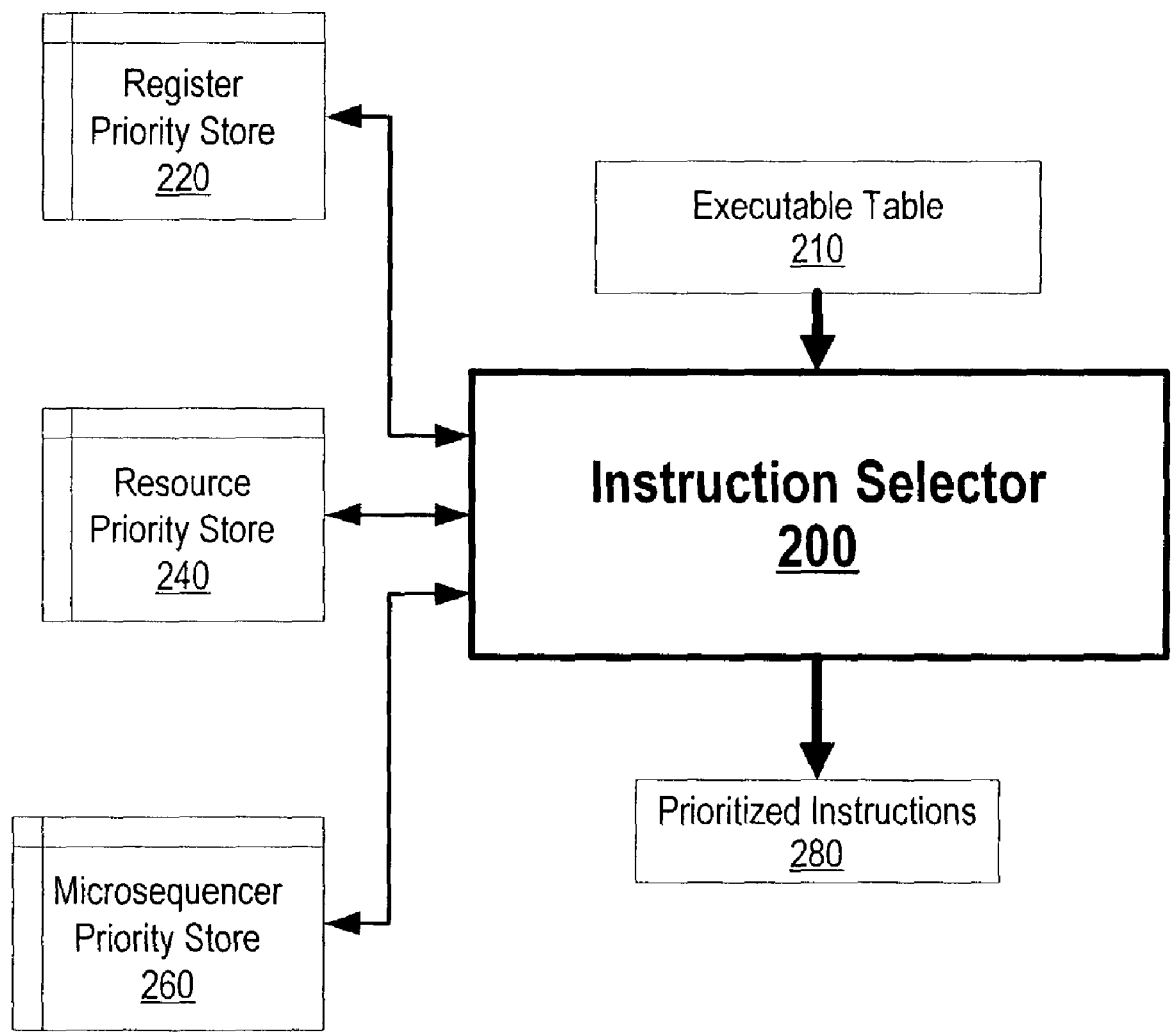
FIG. 2 is a diagram showing an instruction selector identifying an instruction execution order based upon one or more priority bits.

FIG. 2 is a diagram showing an instruction selector identifying an instruction execution order based upon one or more priority bits. Priority bits are set during code execution that inform instruction selector 200 as to which instructions to prioritize from a plurality of executable instructions. For example, if code includes a branch instruction that requires register three, the code sets a register priority bit corresponding to register three which informs instruction selector 200 to prioritize instructions using register three from a plurality of executable instructions.

A priority bit corresponds to a particular entity, such as a register, a resource, or a microsequencer. A register priority bit identifies a particular register location that a branch instruction uses whereby instructions that use the same register location are prioritized. A resource priority bit identifies a particular resource, such as an ADDER, that an instruction corresponding to a branch instruction uses whereby instructions using the same resource are prioritized. A microsequencer priority bit identifies particular circuitry, such as a high-speed bus, that an instruction corresponding to a branch instruction uses whereby instructions using the same circuitry are prioritized.

Instruction selector 200 retrieves instructions from executable table 210 which are executable instructions included in a pipeline. For example, executable table 210 may include five instructions that are ready for execution. Instruction selector 200 retrieves register priority bits from register priority store 220, retrieves resource priority bits from resource priority store 240, and retrieves microsequencer priority bits from microsequencer priority store 260. Register priority store 220, resource priority store 240, and microsequencer priority store 260 may be stored on a volatile storage area or a non-volatile storage area, such as computer memory or a computer hard drive.

Instruction selector 200 compares the executable instructions with the retrieved priority bits in order to prioritize particular instructions located in the plurality of executable instructions. For example, if register priority store 220 includes a register priority bit corresponding to R3, instruction selector 200 prioritizes instructions using R3. Instruction selector 200 prioritizes the executable instructions and includes the prioritized instructions in prioritized instructions 280. The pipeline then executes instructions corresponding to the order of prioritized instructions 280.

Figure 3:
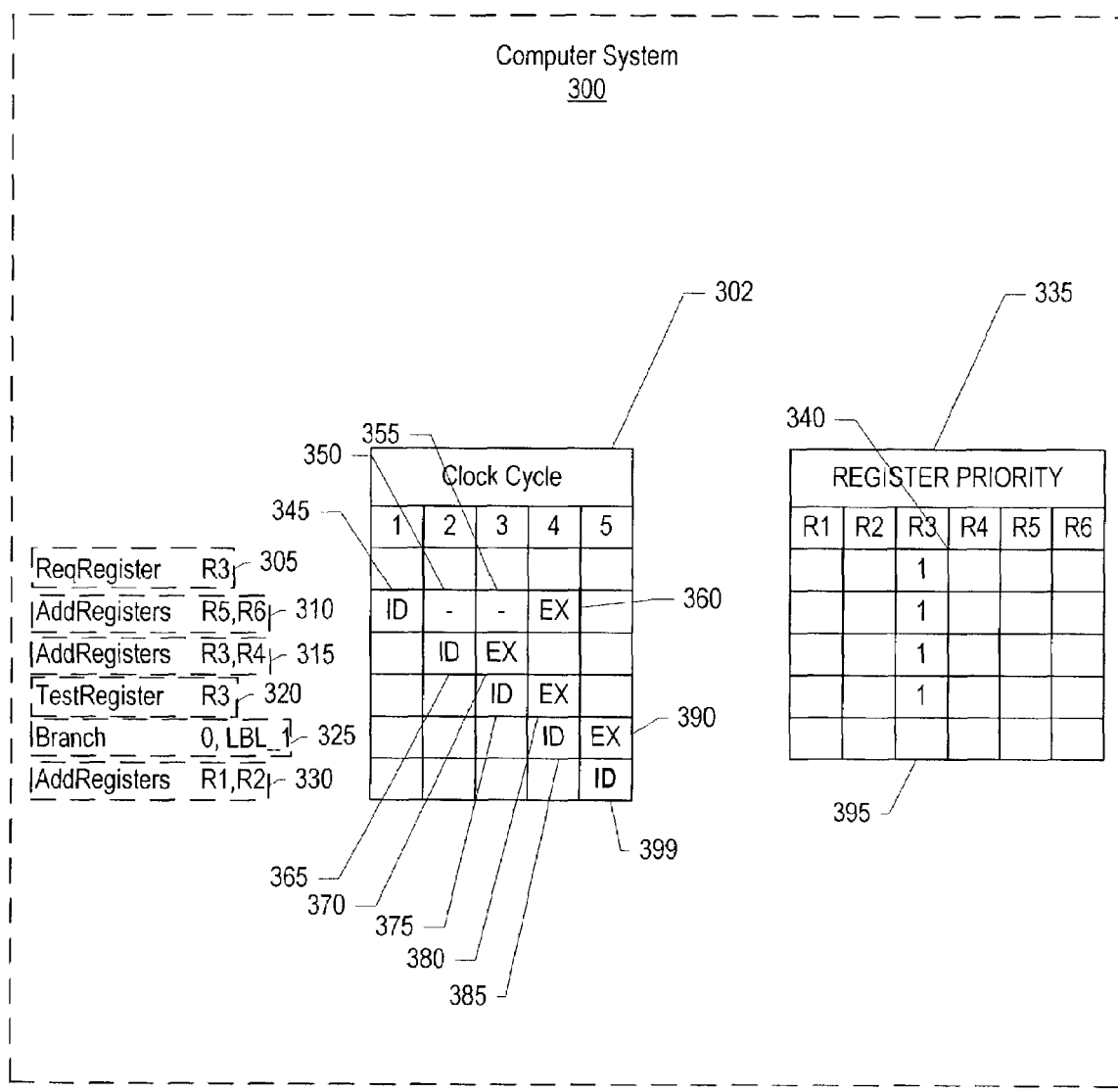
FIG. 3 is a diagram showing pipeline instruction execution using priority bits to determine instruction sequence order.

FIG. 3 is a diagram showing pipeline instruction execution using priority bits to determine instruction sequence order. Computer system 300 includes a pipeline with two stages which are an instruction decode (ID) stage and an instruction execution (EX) stage (see FIG. 1 and corresponding text for further details regarding pipeline stages). Table 302 shows clock cycles when the pipeline decodes and executes particular instructions. Table 335 includes a priority register table which informs the pipeline of priority register locations.

Instruction 305 is a no operation (NO-OP) instruction that sets priority register bit R3 in table 335 (block 340). Priority register bit R3 is set because a branch instruction (e.g. instruction 325) depends upon R3 in order to execute (e.g. instruction 320).

During the first clock cycle, the pipeline decodes instruction 310 (block 345). During the second clock cycle, the pipeline identifies that it is not able to execute instruction 310 because one of the registers that instruction 310 requires, such as R6, is still in use from a previous instruction. Therefore, the pipeline does not execute instruction 310 until the previous instruction is finished using the required register. For example, a previous instruction may be "AddRegisters R6, R8" and the previous instruction has not finished adding the contents of register eight with register six. Therefore, instruction 310 is stalled at the second clock cycle (block 350). The pipeline also decodes instruction 315 during the second clock cycle (block 365).

During the third clock cycle, instruction 310's required register is ready to use and the pipeline is able to execute either instruction 310 or instruction 315. Both instruction 310 and instruction 315 require an ADDER. However, the pipeline's device only has one ADDER which causes the pipeline to reference table 335 to determine whether a register priority bit corresponds to one of the executable instructions. The pipeline determines that instruction 315 uses register three which is a priority register location and, therefore, chooses to execute instruction 315 (block 370) instead of instruction 310 (block 355). The pipeline also decodes instruction 320 during the third clock cycle (block 375).

During the fourth clock cycle, the pipeline executes instruction 310 (block 360). Since the pipeline executed instruction 315 during the third clock cycle, the pipeline is able to execute instruction 320 during the fourth clock cycle (block 380). The pipeline is able to execute both instruction 310 and instruction 320 during the fourth clock cycle because each instruction uses a different resource. The pipeline also decodes instruction 325 during the fourth clock cycle (block 385).

During the fifth clock cycle, the pipeline is able to execute instruction 325 (block 390) because the pipeline executed instruction 320 during the fourth clock cycle. As can be seen in FIG. 3, the pipeline does not stall the branch instruction (e.g. instruction 325) which results in improved branch performance for the pipeline. Once the branch instruction executes, its corresponding register priority bit is cleared (block 395). The pipeline also decodes instruction 330 during the fifth clock cycle (block 399) which may be cleared based upon the results of instruction 325.

Figure 4:
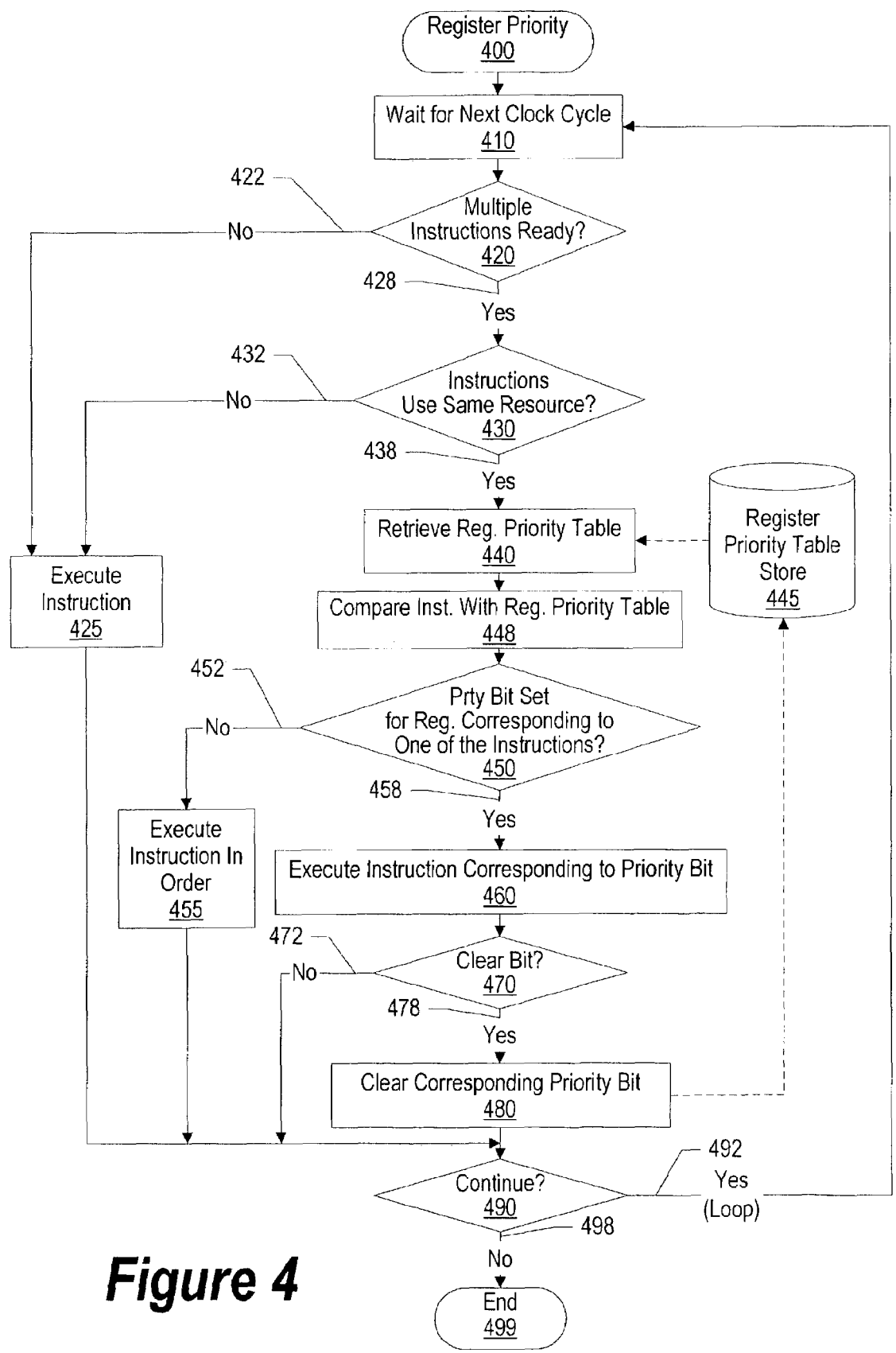
FIG. 4 is a flowchart showing steps taken in executing instructions in a pipeline based upon a register priority bit.

FIG. 4 is a flowchart showing steps taken in executing instructions in a pipeline based upon a register priority bit. Processing commences at 400, whereupon processing waits for the next clock cycle. For example, processing may execute instructions on the rising edge of a system clock. A determination is made as to whether the pipeline includes a plurality of instructions that are ready for execution (decision 420). An executable instruction is an instruction that uses one or more registers and resources that are available during the clock cycle.

If the pipeline does not have multiple instructions to execute, decision 420 branches to "No" branch 422 whereupon processing executes an instruction that is ready for execution at step 425. On the other hand, if the pipeline includes more than one executable instruction, decision 420 branches to "Yes" branch 428.

A determination is made as to whether the plurality of executable instructions uses an identical resource. For example, a first instruction may be ready for an ADD operation and a second instruction may also be ready for an ADD operation. If each of the plurality of executable instructions does not require an identical resource, decision 430 branches to "No" branch 432 whereupon the plurality of instructions are executed simultaneously since they do not require an identical resource (step 425).

On the other hand, if a plurality of executable instructions require an identical resource resource, decision 430 branches to "Yes" branch 438 whereupon processing retrieves a register priority table from data store 445. The register priority table includes a register priority bit that corresponds to an upcoming branch instruction's register requirements. For example, a branch instruction may be ready to load into the pipeline that compares the contents of R3 with "0". In this example, R3 is a priority register and, as such, a priority bit is included in the priority table prior to the branch instruction that corresponds to R3. Data store 445 may be stored on a non-volatile storage area, such as a computer hard drive.

Processing compares the register priority table with each executable instruction to identify whether an executable instruction uses a priority register location (step 448). A determination is made as to whether there is an executable instruction that uses a priority register location (decision 450). If the plurality of executable instructions do not include an instruction that uses a priority register location, decision 450 branches to "No" branch whereupon processing executes an instruction in sequential order.

For example, if the register priority table does not include a register priority bit and if a first instruction and a second instruction each required an ADDER, processing executes the first instruction prior to executing the second instruction. In another example, a priority bit may be set for R2 but neither executable instruction uses R2. In this example, processing executes the identified instructions in sequential order since neither instruction uses a priority register location.

On the other hand, if one of the executable instructions uses a priority register location, decision 450 branches to "Yes" branch 458 whereupon processing executes the instruction which uses the priority register location (step 460).

A determination is made as to whether to clear the priority bit (decision 470). For example, the recently executed instruction may not be the last instruction to use the priority register location before the branch instruction executes. In this example, the priority bit remains set until each instruction that uses the priority register location is executed prior to executing the branch instruction. In one embodiment, the register priority bit may be an inferential priority bit. In this embodiment, the inferential priority bit may be cleared and the priority bit corresponding to a branch instruction may stay set (see FIG. 6 and corresponding text for further details regarding inferential priority bits).

If processing should not clear the priority bit, decision 470 branches to "No" branch 472 bypassing priority bit clearing steps. On the other hand, if processing should clear the priority bit, decision 470 branches to "Yes" branch 478 whereupon processing clears the priority bit located in data store 445 at step 480.

A determination is made as to whether to continue processing (decision 490). If processing should continue, decision 490 branches to "Yes" branch 492 which loops back to process instructions during the next clock cycle. This looping continues until processing should halt, at which point decision 490 branches to "No" branch 498 whereupon processing ends at 499.

Figure 5:
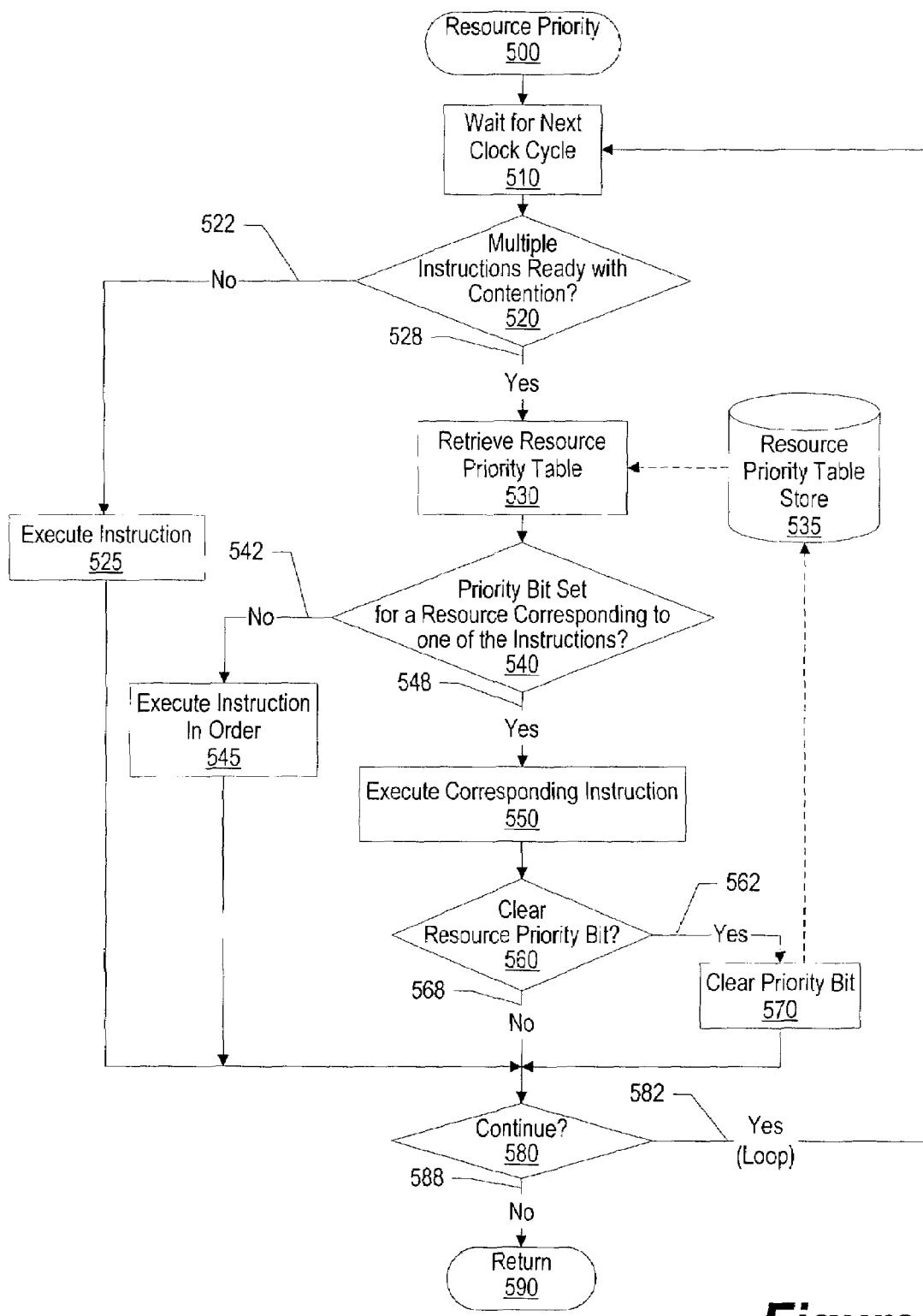
FIG. 5 is a flowchart showing steps taken in prioritizing executable instructions based upon a resource priority bit.

FIG. 5 is a flowchart showing steps taken in prioritizing executable instructions based upon a resource priority bit. Processing commences at 500, whereupon processing waits for the next clock cycle (step 510). For example, processing may execute instructions on the rising edge of a system clock. A determination is made as to whether the pipeline includes a plurality of executable instructions that also have contention (decision 520). For example, a first instruction may use register 3 (R3), a second instruction may use register 6 (R6), and a register priority table includes priority bits that correspond to R3 and R6 (see FIG. 4 and corresponding text for further details regarding register priority bits).

If the pipeline does not have a plurality of executable instructions with contention, decision 520 branches to "No" branch 522 whereupon processing executes the instructions in sequential order at step 525. On the other hand, if processing has a plurality of executable instructions with contention, decision 520 braches to "Yes" branch 528. Processing retrieves a resource priority table from data store 535 at step 530. The resource priority table includes resource priority bits that correspond to a particular resource, such as a comparator or an adder. Data store 535 may be stored on a non-volatile storage area, such as a computer hard drive.

A determination is made as to whether one of the contented instructions uses a resource that corresponds to a resource priority bit located in the resource priority table (decision 540). Using the example described above, a resource priority bit may be set for an ADDER and the first instruction is "AddRegisters". If one of the contended resources does not use a resource corresponding to a resource priority bit, decision 540 branches to "No" branch 542 whereupon processing executes the instructions in sequential order. On the other hand, if one of the contended instructions uses a resource that corresponds to a resource priority bit, decision 540 branches to "Yes" branch 548 whereupon processing executes the instruction that uses the priority resource (step 550).

A determination is made as to whether to clear the resource priority bit (decision 560). For example, the recently executed instruction may not be the last instruction to use the priority resource before a branch instruction executes. In this example, the resource priority bit remains set until each instruction that uses the resource is executed prior to executing the branch instruction. If processing should not clear the resource priority bit, decision 560 branches to "No" branch 568 bypassing priority bit clearing steps. On the other hand, if processing should clear the resource priority bit, decision 560 branches to "Yes" branch 562 whereupon processing clears the resource priority bit located in data store 535 at step 570.

A determination is made as to whether to continue processing (decision 580). If processing should continue, decision 580 branches to "Yes" branch 582 which loops back to process instructions during the next clock cycle. This looping continues until processing should halt, at which point decision 580 branches to "No" branch 588 whereupon processing ends at 590.

Figure 6:
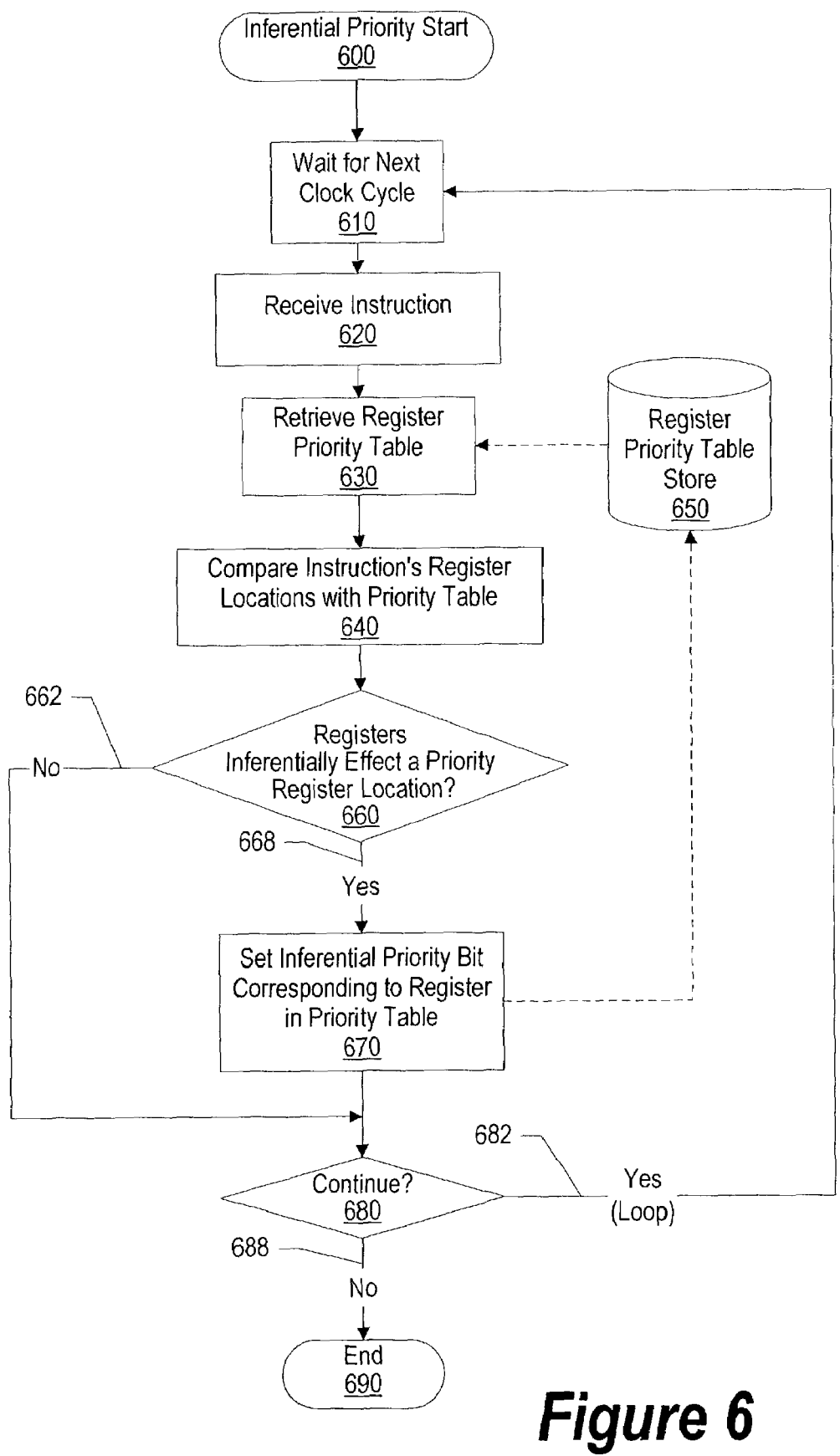
FIG. 6 is a flowchart showing steps taken in identifying a register location that inferentially affects a priority register location and setting an inferential priority bit corresponding to the identified register location.

FIG. 6 is a flowchart showing steps taken in identifying a register location that inferentially affects a priority register location and setting an inferential priority bit corresponding to the identified register location. Processing commences at 600, whereupon processing waits for the next clock cycle at step 610. For example, processing may execute instructions on the rising edge of a system clock. Processing receives an instruction to load into a pipeline at step 620. For example, the instruction may be "AddRegisters R3, R4".

Processing retrieves a register priority table from data store 650 at step 630. The register priority table includes a register priority bit that corresponds to a priority register location that an upcoming branch location requires. For example, the priority table may include a priority bit corresponding to R3. Data store 650 may be stored on a non-volatile storage area, such as a computer hard drive.

Processing compares the instruction's registers with the register priority table to identify one or more register locations that inferentially affect a register priority location (step 640). Using the examples described above, instruction "AddRegisters R3, R4" uses R3 and R4, and since R3 is a register priority location, R4 inferentially affects R3.

A determination is made as to whether the instruction causes a register location to inferentially affect a priority register location (decision 660). Using the example described above, the instruction causes R4 to inferentially affect R3 which is a priority register location. If the instruction does not cause register locations to inferentially affect a priority register location, decision 660 branches to "No" branch 662 bypassing inferential priority bit-setting steps.

On the other hand, if the instruction causes a register location to inferentially affect a priority register location, decision 660 branches to "Yes" branch 668 whereupon processing sets an inferential priority bit corresponding to the instruction's register location at step 670. Using the example described above, processing sets an inferentially priority bit corresponding to R4.

A determination is made as to whether to continue processing (step 680). If processing should continue, decision 680 branches to "Yes" branch 682 which loops back to process instructions during the next clock cycle. This looping continues until processing should halt, at which point decision 680 branches to "No" branch 688 whereupon processing ends at 690.

Figure 7:
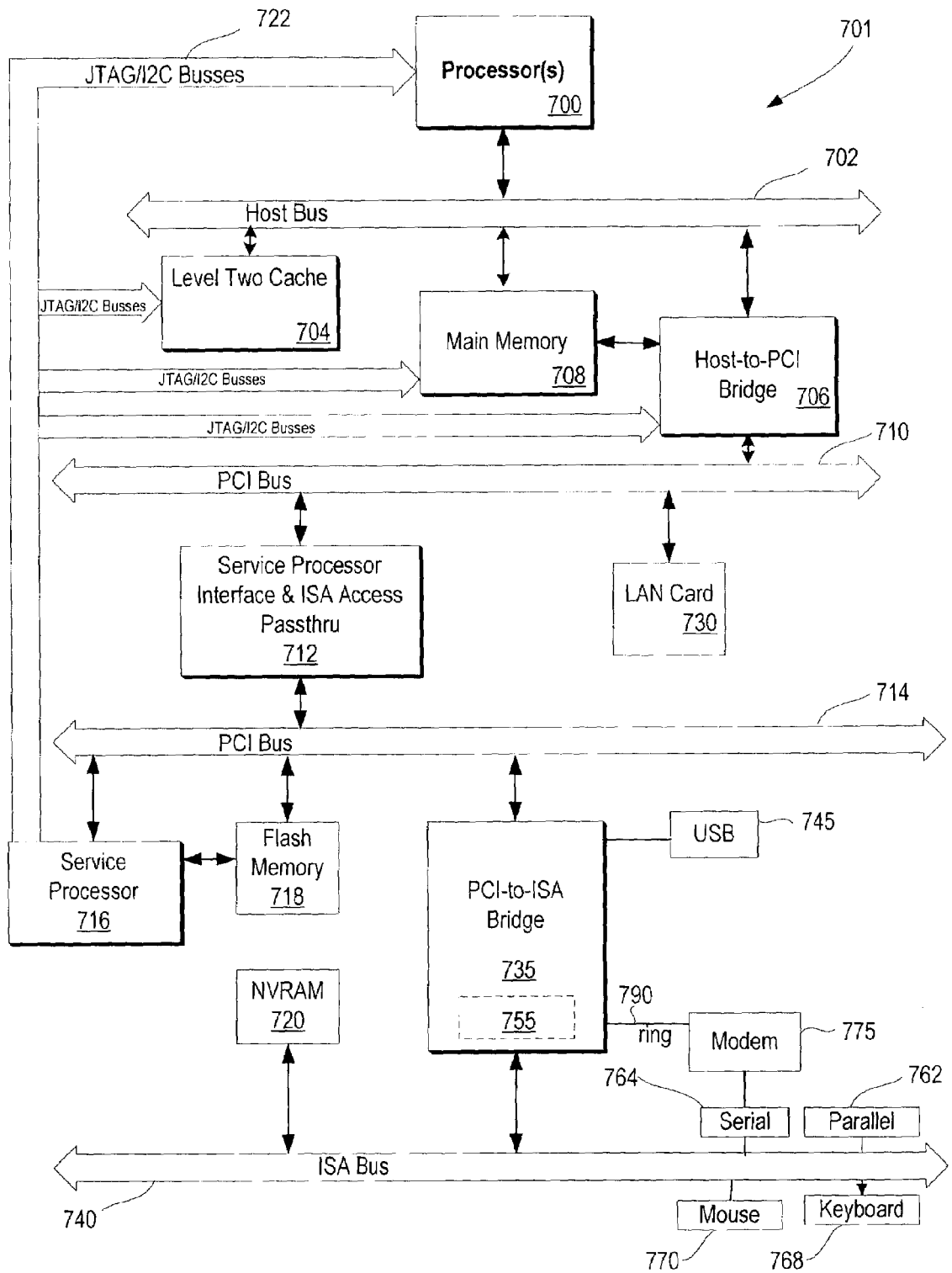
FIG. 7 is a block diagram of an information handling system capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2, cache 704, Host-to-PCI bridge 706, and main memory 708 providing a communications path between the processor, the Service Processor, the L2, cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in a computer operable media, for example, on a hard disk drive, or in removable storage such as an optical disk (for eventual use in a CD ROM) or floppy disk (for eventual use in a floppy disk drive). The set of instructions may also be downloaded via a transmission medium such as the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of improved code performance in a computer system, said method comprising:
   identifying a plurality of executable instructions, wherein each of the plurality of instructions is included in a pipeline and is positioned in code prior to an upcoming branch instruction;
   selecting an instruction from the plurality of executable instructions, the selecting based upon a priority indicator that is a microsequencer priority bit that indicates the selected instruction utilizes circuitry required by the upcoming branch instruction; giving priority to an instruction identified by the microsequencer priority bit; and executing the selected instruction, wherein the identifying, the selecting, and the executing are all performed within a same clock cycle.

2. The method as described in claim 1 wherein the priority indicator corresponds to the upcoming branch instruction.

3. The method as described in claim 1 further comprising:
   determining whether to clear the priority indicator based upon the selected instruction; and
   clearing the priority indicator in response to the determination.

4. An information handling system comprising:
   one or more processors;
   a memory accessible by the processors;
   one or more nonvolatile storage devices accessible by the processors; and
   a code performance tool to improve code performance in a computer system, the code performance tool including:
      an identification unit for identifying a plurality of executable instructions, wherein each of the plurality of instructions is included in a pipeline located in one of the processors and is positioned in code prior to an upcoming branch instruction;
      selection logic for selecting an instruction from the plurality of executable instructions, the selecting based upon a priority indicator that is a microsequencer priority bit that indicates the selected instruction utilizes circuitry required by the upcoming branch instruction and is located in the memory and for giving priority to an instruction identified by the microsequencer priority bit; and an execution unit for executing the selected instruction, wherein the identifying, the selecting, and the executing are all performed within a same clock cycle.

5. The information handling system as described in claim 4 wherein the priority indicator corresponds to the upcoming branch instruction.

6. The information handling system as described in claim 4 further comprising:
   determination logic for determining whether to clear the priority indicator in the memory based upon the selected instruction; and
   bit clearing logic for clearing the priority indicator in the memory in response to the determination.

7. A computer program product stored on a computer operable media for improving code performance in a computer system, said computer program product comprising:
- means for identifying a plurality of executable instructions, wherein each of the plurality of instructions is included in a pipeline and is positioned in code prior to an upcoming branch instruction;
- means for selecting an instruction from the plurality of executable instructions, the selecting based upon a priority indicator that is a microsequencer priority bit that indicates the selected instruction utilizes circuitry required by the upcoming branch instruction; means for giving priority to an instruction identified by the microsequencer priority bit; and means for executing the selected instruction, wherein the identifying, the selecting, and the executing are all performed within a same clock cycle.

8. The computer program product as described in claim 7 wherein the priority indicator corresponds to the upcoming branch instruction.

9. The computer program product as described in claim 7 further comprising:
- means for determining whether to clear the priority indicator based upon the selected instruction; and
- means for clearing the priority indicator in response to the determination.

* * * * *